(12) United States Patent  
Knight et al.

(10) Patent No.: US 7,954,952 B2  
(45) Date of Patent: Jun. 7, 2011

(54) SYSTEM FOR COMBINED SECURITY AND DISPLAY OF PUBLICLY VIEWABLE INFORMATION

(75) Inventors: James Donald Knight, Excelsior, MN (US); Fred van der Kort, Zeewolde (NL); Erik J. Glotzbach, Zeewolde (NL)

(73) Assignee: ADDvertisement, LLC, Excelsior, MN (US)

( * ) Notice: Subject to any disclaimer, the term of this patent is extended or adjusted under 35 U.S.C. 154(b) by 699 days.

(21) Appl. No.: 11/768,631

(22) Filed: Jun. 26, 2007

(65) Prior Publication Data

US 2008/0002068 A1 Jan. 3, 2008

Related U.S. Application Data

(60) Provisional application No. 60/817,633, filed on Jun. 29, 2006, provisional application No. 60/864,839, filed on Nov. 8, 2006.

(51) Int. Cl.
*G03B 21/26* (2006.01)
*G03B 21/56* (2006.01)

(52) U.S. Cl. .......................................... 353/28; 359/461
(58) Field of Classification Search .................... 353/28, 353/71, 46; 359/450, 454, 456, 460, 461
See application file for complete search history.

(56) References Cited

U.S. PATENT DOCUMENTS

| | | | |
|---|---|---|---|
| 5,657,805 A | 8/1997 | Magro | |
| 6,029,735 A * | 2/2000 | Nicholson | 160/321 |
| 6,047,576 A | 4/2000 | Lanigan et al. | |
| 6,049,448 A | 4/2000 | Lanigan et al. | |
| 6,060,993 A | 5/2000 | Cohen | |
| 6,089,626 A | 7/2000 | Shoemaker | |
| 6,131,354 A | 10/2000 | Thompson | |
| 6,337,769 B1 * | 1/2002 | Lee | 359/454 |
| 6,695,452 B2 * | 2/2004 | Panasewicz et al. | 353/119 |
| 2004/0163314 A1 * | 8/2004 | Lagarde et al. | 49/31 |
| 2005/0072089 A1 * | 4/2005 | Wong | 52/473 |

FOREIGN PATENT DOCUMENTS

JP 62-269988 * 11/1987

OTHER PUBLICATIONS

The Argus, Portsade The Community College, "See-through shutters are a bright idea", by the Argus business staff, Mar. 5, 2005 (2 pages).
http://www.euroll.co.uk/ Euroll Security Shutters Ltd., copyright 2005 website, Jun. 9, 2006 (2 pages).
http://www.euroll.co.uk/index.php?p=innovation, copyright 2005, Dec. 17, 2007 (1 page).
Euroll Security Shutters Ltd., See-Through shutters are a bright idea, by James Lancaster, copyright 2005 (1 page).

* cited by examiner

*Primary Examiner* — Thanh X Luu
(74) *Attorney, Agent, or Firm* — Ladas & Parry LLP

(57) ABSTRACT

A secure display system comprises one or more closure devices having non-transparent polycarbonate projection panels, one or more projectors, and a PC for providing both security and advertising capabilities. The secure display system can display publicly viewable information by projecting images containing, for example, text, graphics, and video from the inside through the projection panels, thus creating an externally viewable display while securing the premises. In some embodiments, the closure device can include a plurality of projection panels in the form of a security roll down shutter. Transparent viewing panels can also be included adjacent the projection panels to provide both viewing and projecting capabilities.

20 Claims, 4 Drawing Sheets

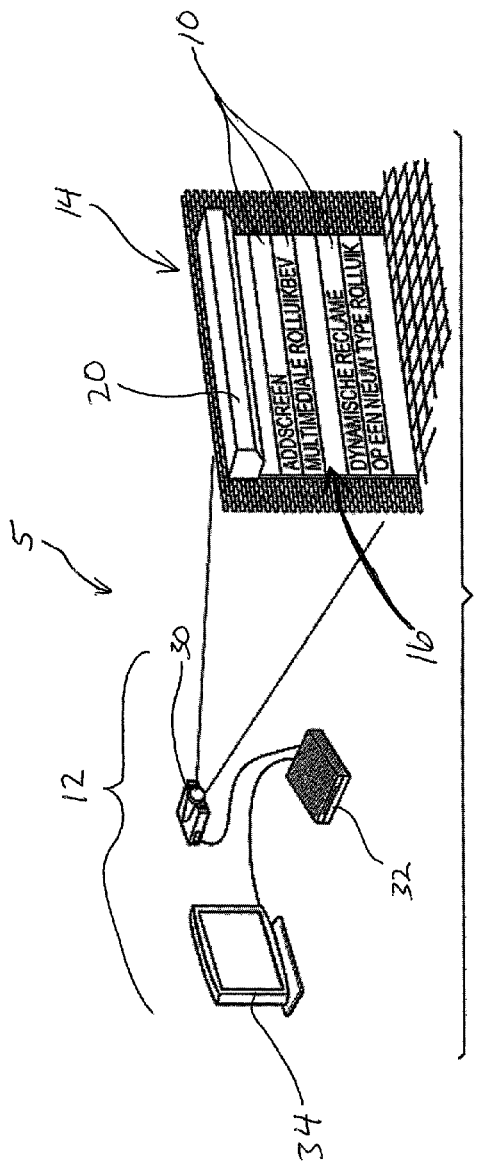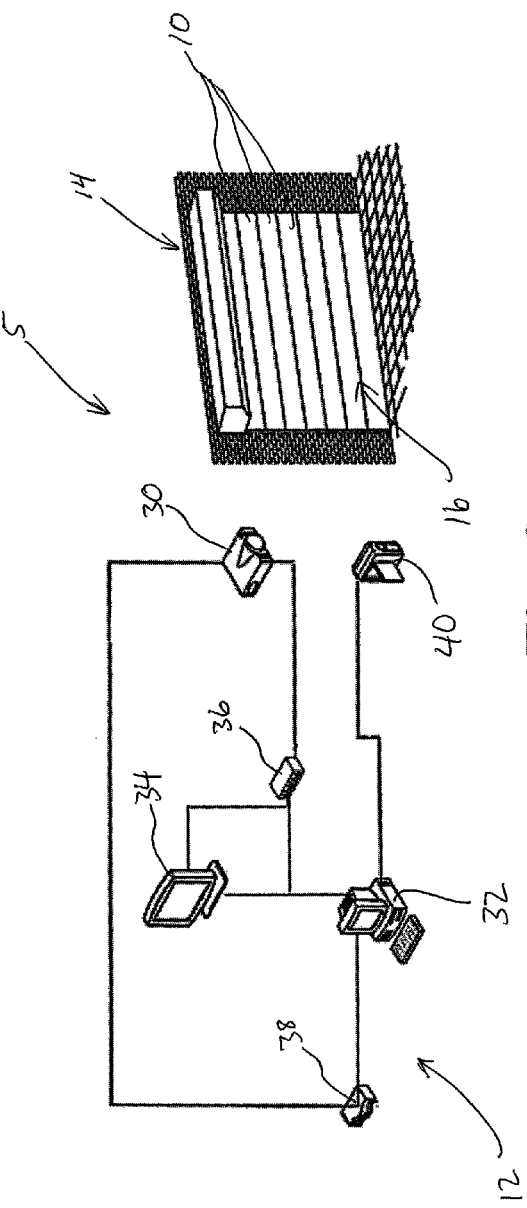

SYSTEM FOR COMBINED SECURITY AND DISPLAY OF PUBLICLY VIEWABLE INFORMATION

CROSS REFERENCE TO RELATED APPLICATIONS

This application claims the benefit of U.S. Provisional Application Nos. 60/817,633, filed Jun. 29, 2006, and 60/864,839, filed Nov. 8, 2006, the contents of both of which are incorporated herein by reference.

BACKGROUND OF THE INVENTION

This invention relates generally to systems for presenting a visual display of information for advertising or other purposes and to systems for securing spaces. The invention more specifically relates to a system which uses projection panels for advertising purposes.

Large windows are traditionally placed on the front of retail stores and other businesses. Storefront windows are popular because they offer several advantages. For example, storefront windows allow shopkeepers to view exterior portions of the store adjacent the windows, thus giving them a better understanding of what goes on outside their store. Similarly, storefront windows allow shoppers to view interior portions of the store so they can "window shop." With respect to stores having outdoor exposure, storefront windows also help to bring in natural light during daytime hours. This helps to provide the desired atmosphere for the store.

To allow for the window shopping mentioned above, shopkeepers or businesspeople have the need to show their merchandise and display product models when the shop is either open or closed. However, they are generally limited by the small amount of space directly behind the windows. This makes the efficient use of window space very important for shop owners.

In addition to product display, advertising opportunities are also important. Spaces in or near an actual store/shop present obvious advertising opportunities which must be taken advantage of. In some instances, this must include the use of doors and windows as advertising media. Traditionally, this has been handled by pull down shades or drapes having the desired advertising printed thereon. When these shades or blinds are drawn however, no light is allowed into the store/shop.

While advertising and product display are important, shop security is also a critical concern. Unfortunately, theft and burglary are real issues for retail shop owners to deal with. Thus, security barriers that are strong and reliable are necessary. Classical glass windows and breakable closure doors do not meet this need.

Securing retail stores and other establishments is traditionally accomplished by using steel roll-down shutters, chain link gates, sliding door panels, and other closure techniques. This kind of security creates several undesirable circumstances. For example, it is no longer possible for shopkeepers or other businesspeople to show their merchandise to the passing public. There is a desire to show their merchandise, display product models or advertisements even when the shop is closed. Naturally, shop windows, doorways, and other openings create an opportunity to achieve this advertising. Unfortunately, it is not possible to use in-store advertising systems like narrowcasting, posters or banners when security means, e.g., closed shutters, cover the displayed information. Further, the closed shutters or gates create an unfriendly atmosphere.

The above mentioned needs for both security and display, such as advertising, unfortunately create competing concerns/interests. From an advertising perspective, an open configuration is desired which allows for viewing and display. Conversely, better security is achieved when doorways and openings are enclosed. In other situations, protection from the elements is required, such as storm protection. Thus, there is a need for a system that achieves the necessary security and protection, while also allowing an effective display of information.

BRIEF SUMMARY OF THE INVENTION

A secure display system is provided for securely closing off one or more openings in a building, such as doors and windows. The secure display system can include a closure device in the form of a non-transparent polycarbonate projection panel, and/or a plurality of non-transparent polycarbonate projection panels configured as a roll down shutter for displaying an image. The secure display system can include a projection system for projecting an image upon the one or more projection panels. A computer/controller generates the image which is then projected via a projector positioned and aligned for illuminating the one or more projection panels to recreate the image upon the one or more projection panels.

In some embodiments, the secure display system can include one or more viewing panels comprising a transparent polycarbonate material, positioned adjacent the one or more projection panels. A projected image can be created by loading image data into an image template having image locations corresponding to the location of the one or more projection panels within the closure device to ensure an effective and properly aligned image display. The displayed image can included graphics, text, video, and/or other information, including advertising.

Some embodied secure display systems can include multiple closure devices configured for securely closing off multiple openings, such as multiple openings in a single building or within different buildings. The projection system can include multiple projectors positioned and aligned for illuminating the one or more projection panels of each closure device. Capability is provided for the controller to generate a different image or the same image to be displayed in connection with each closure device. The image data can be stored locally in a PC/controller, and in some cases can be stored on a content server configured to connect to the projection system over a network. The multiple closure devices can include different combinations of closure devices. In one case, a closure device taking the form of a shutter can be used in conjunction with a closure device taking the form of a polycarbonate window panel in order to effectively secure the building while displaying one or more images.

A method of displaying one or more images while securing an opening in a building includes temporarily securing an opening in a building with a roll down shutter where the shutter includes multiple non-transparent polycarbonate projection panels. An image can be generated for display on the multiple projection panels, after which the method includes projecting the image onto a first surface of the projection panels such that the image can be viewed from a second surface of the projection panels.

BRIEF DESCRIPTION OF THE DRAWINGS

In the accompanying drawings various possible exemplary embodiments of the invention are shown. It is understood that these embodiments are simply certain examples showing how the invention could be utilized. It is also understood that several other variations are possible without departing from the scope and spirit of the invention.

FIG. 1 is a perspective view of a typical secure display system incorporating a roll down shutter in accordance with the present invention.

FIG. 2 is a representation of the information flow of a typical secure display system in a stand alone environment.

DETAILED DESCRIPTION OF THE INVENTION

Figure 3:
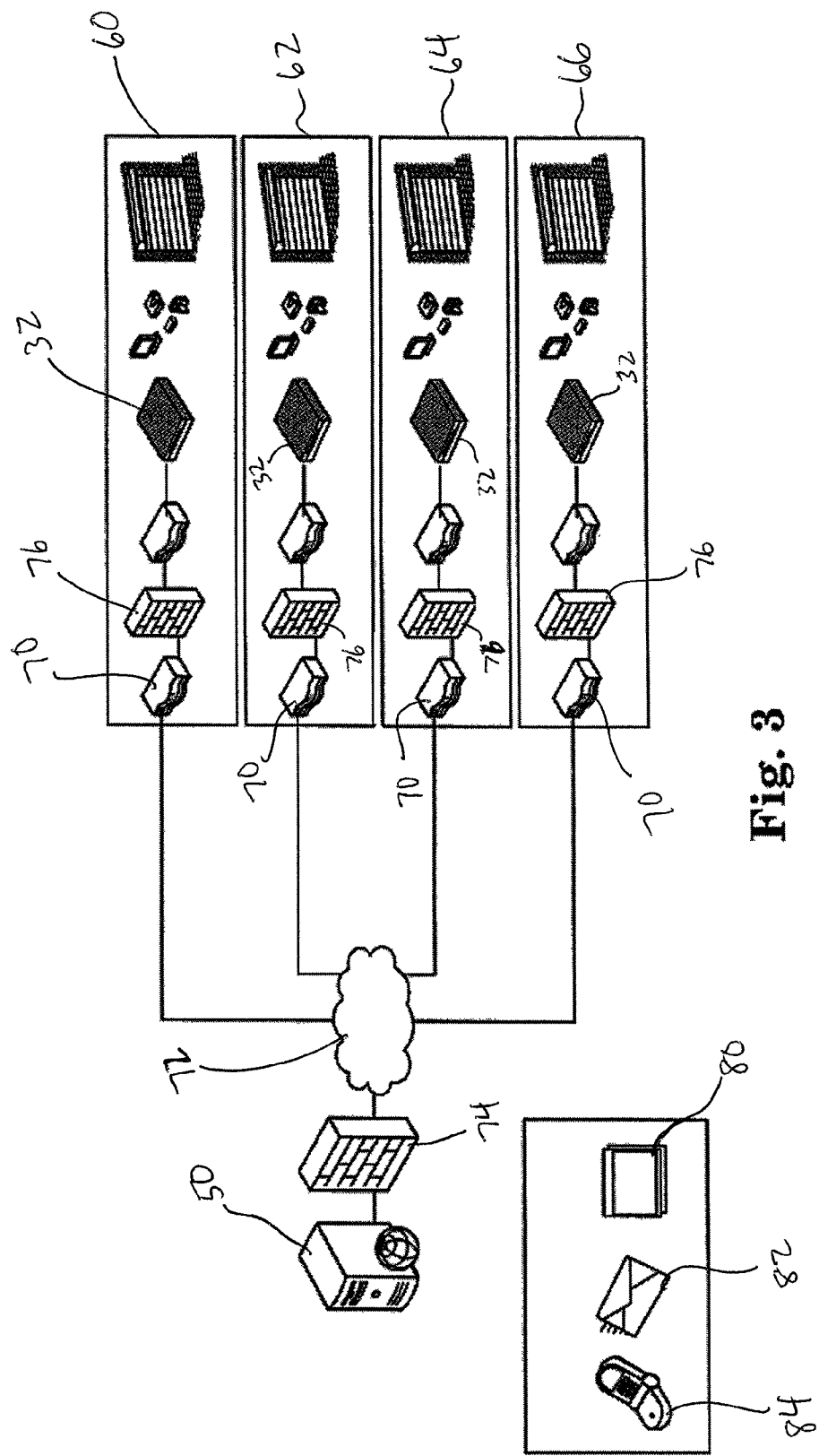
FIG. 3 is a representation of the information flow of a typical secure display system in a networked environment.

The following detailed description should be read with reference to the drawings, in which like elements in different drawings are numbered identically. It will be understood that embodiments shown in the drawings and described herein are merely for illustrative purposes and are not intended to limit the invention to any embodiment. On the contrary, it is intended to cover alternatives, modifications, and equivalents as may be included within the scope of the invention as defined by the appended claims.

Generally speaking, the present invention provides a solution which meets both competing interests of information and/or merchandise display, and security concerns for shopkeepers. A secure display system is provided, which also has the dual capability of securing a building or other environment. The information display is merely limited by the creativity and use of those designing the display system, as full graphic capability is provided. Additionally, the display system can be strong enough to thwart any burglary or undesired entrance attempts.

Referring to FIG. 1, a display system 5 generally includes a plurality of projection panels 10 combined with a projection system 12. The projection panels 10 also operate to securely close off an opening (e.g., a window or doorway), thus providing a secure building for the shopkeeper. As shown in FIG. 1, the projection panels 10 can be part of a closure device 14. The projection panels 10 in this embodiment are incorporated into a roll down shutter 16 as a plurality of slats all combined via an appropriate shutter framework to achieve a shutter closure device that can be raised or lowered, and will roll up into a container 20. For example, the shutter framework can comprise projection panel holders interconnected with one another. Such a configuration allows the projection panels 10 to roll up in a rectangular (e.g., square) overlapping fashion about a cylindrical tube for storing in the container 20.

The projection panels 10 can comprise a non-transparent (e.g. milky white) polycarbonate material having diffusion properties capable of transferring a display image projected at one side such that is can be seen when viewing the material from the opposing side. Thus, customers and passersby can see the display image from outside the building when it is projected from inside the building. The polycarbonate material is solidly constructed and provides an adequate level of protection and theft deterrent as it encloses the building windows, doors, and other openings. While one possible material for the projection panels 10 has been described, it will be appreciated by those skilled in the art that other materials having similar properties may also be employed.

The projection system 12 typically includes a projector 30 coupled to a computer (PC) 32 or similar controller. For example, the projector 30 can be attached using a VGA cable or a CAT5 network cable to the PC 32. The PC/controller 32 includes necessary software to implement the graphic display as desired. As further outlined below, the projection system 12 is specifically configured to cooperate with the projection panels 10 to provide an effective and usable display of information. In addition, an in-store display 34 is also shown in FIG. 1. This in-store display 34 is capable of in-store narrow casting, and can easily display information identical to that displayed on the projection panels 10.

Further details regarding one potential connection methodology are shown in FIG. 2. As can be seen, projection system 12 includes PC 32 connected via various connections to projector 30 and a display unit 56. More specifically, PC 32 is connected to a VGA splitter 36, which can then provide signals to both projector 30 and display 34. Optionally, certain components may also be added including a network switch 38 and optional image input devices 40, such as cameras. Each of these components are connected via appropriate connection methodology such as CAT5 network cables, VGA cables, USB cables, or fire wire cables. As will be easily recognized by those skilled in the art, appropriate connections and connection methodologies provide certain advantages in the right situations. For example, a wireless connection methodology may be advantageous in certain situations.

Based upon the configurations above, it can be seen how various information can easily be displayed on both the in-store display and the projection panels 10 of the shutter 16 making up the closure device 14. Changes and modifications to the information displayed can be easily achieved via the PC 32 making up the system. In addition, it should be noted that this PC 32 could also potentially control multiple closure/display devices in various locations. FIG. 3 provides one illustration of an implementation where multiple displays are used. As shown, appropriate network connections are provided so that image data on a content server 50 is accessible by multiple PCs 32 at each of the multiple locations. More specifically, a first location 60, a second location 62, a third location 64, and a fourth location 66 are all illustrated in FIG. 3. Each of these locations can include the components outlined above and shown in FIG. 2. In addition, each location includes a network router 70 connected to content server 50 through a network 72, e.g., through an Internet connection. FIG. 3 also illustrates a content server side fire wall 74, and related location fire walls 76 for providing desired levels of information security. In this particular application, all locations could easily be programmed to display identical information if appropriate. Alternatively, the actual controlling PC at each particular location could run slightly different display presentations, all based upon image data contained on content server 50. Additionally, FIG. 3 illustrates the possibility of modifying content from remote locations via appropriate control of the content server. For example, the image content can easily be changed on a stand-alone PC or through several interfaces (e.g., webpage 80, database, E-mail 82, SMS 84, etc.) when in a networked environment.

As seen from looking at the various figures discussed above, the combination closure/display device 14 of the present invention includes any number of projection panels 10 combined with a framework to provide the roll down shutter 16 and security features. In this situation, the projection panels provide opportunity for the display of information. In order to effectively accomplish this display, desired image data can be loaded into an image template. The image template corresponds to the framework and projection panel design, including, for example, multiple image locations corresponding to the projection panel dimensions and layout, and image gaps corresponding to gaps between the projection panels 10 and/or opaque or transparent areas within the shutter 16. Once the PC/controller loads the desired image data into the template, the projection system 12 projects the loaded image upon the one or more shutters 16. Thus images containing advertisements or any other information (e.g., time, date, weather info, travel info, stock info, sports info, etc) can be displayed to shoppers or those passing by the store. It will be easily recognizable that a wide variety of image templates are possible according to different shutter designs. As just one example, projection panels 10 may only comprise a specific section of the shutter 16, with transparent viewing panels occupying other sections. A corresponding image template can ensure that the image is projected only onto the section of the shutter comprising the projection panels.

Figure 4:
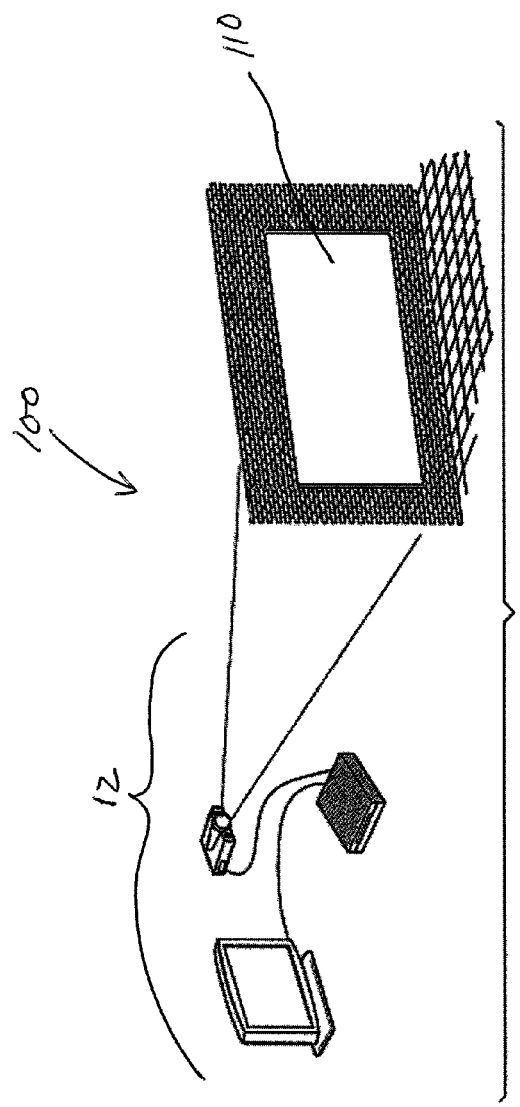
FIG. 4 is a perspective view of a typical secure display system incorporating a projection panel in accordance with the present invention.
Figure 5:
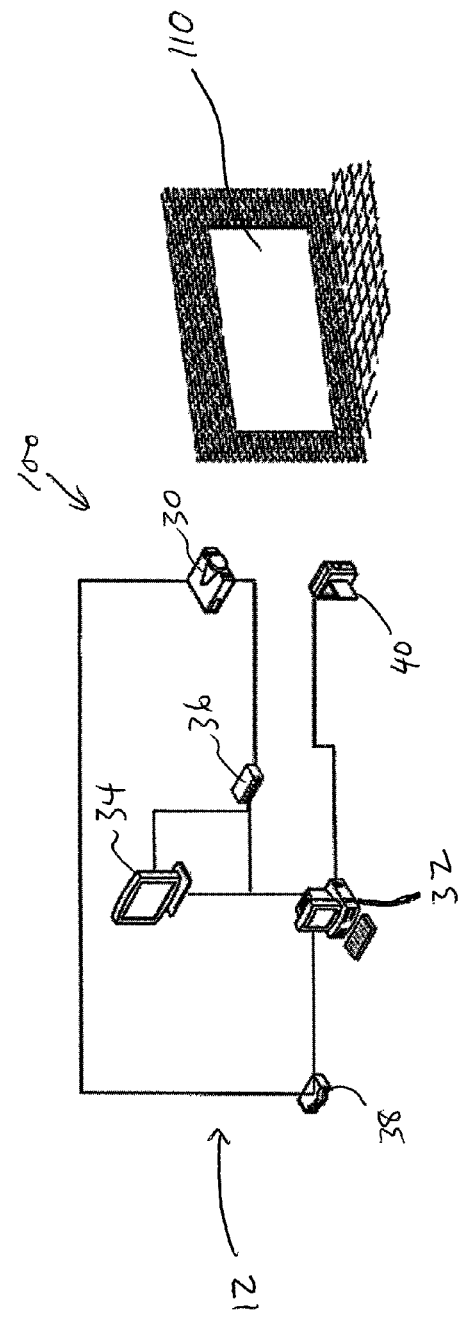
FIG. 5 is a representation of the information flow of a typical secure display system in a stand alone environment.
Figure 6:
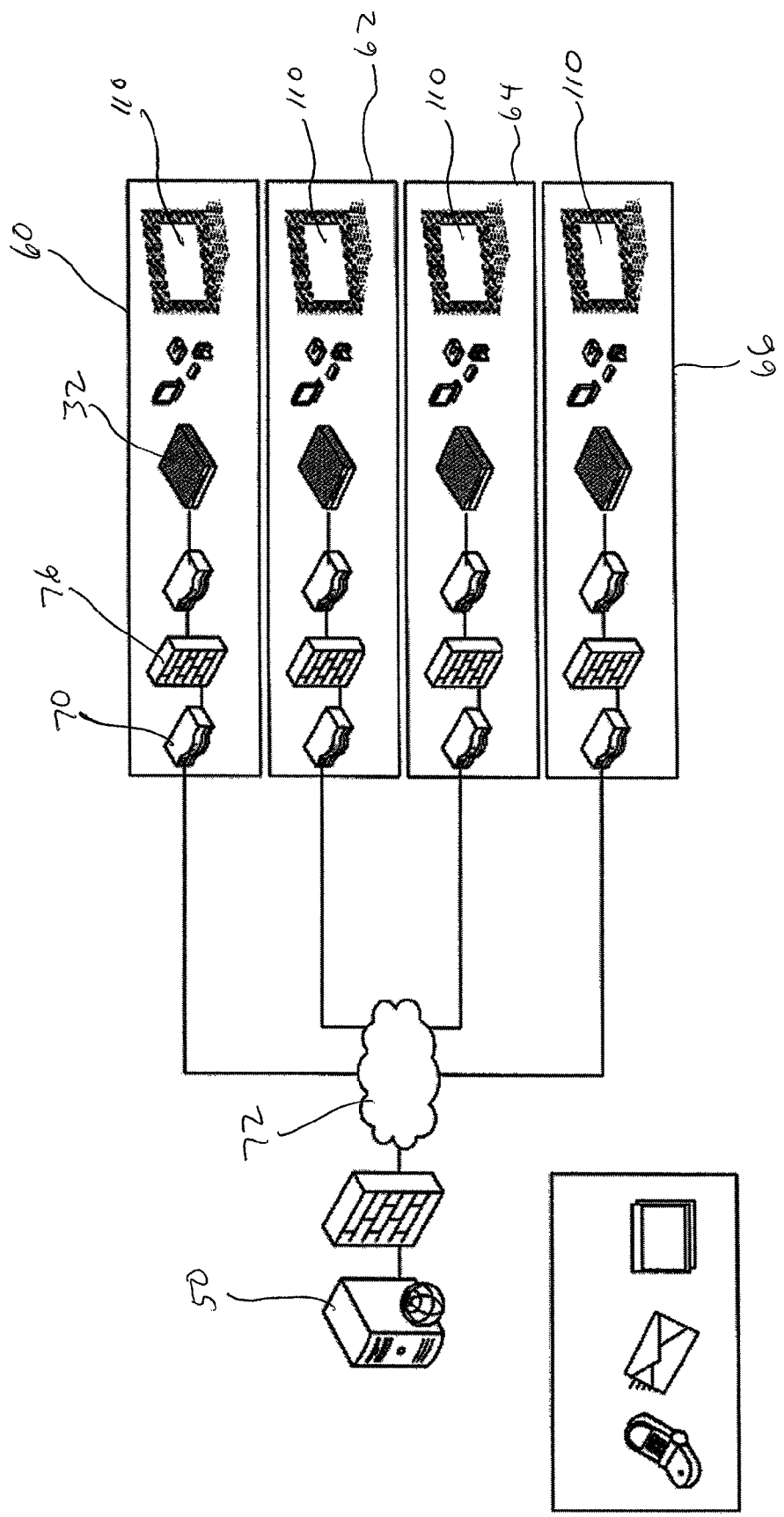
FIG. 6 is a representation of the information flow of a typical secure display system in a networked environment.

FIGS. 4-6 illustrate alternate embodiments similar in some respects to the embodiments depicted in FIGS. 1-3. Referring to FIGS. 4 and 5, a display system 100 generally includes any number of projection panels 110 combined with a projection system 12. The projection panel 110 also operates to securely close off an opening (e.g., a window or door), thus providing a secure building for the shopkeeper. The projection panel 110 may, for example, replace glass panels such as those typically found in windows and doors. By utilizing these projection panels, the display system 100 is able to display publicly viewable information by projecting images containing text, graphics, and/or video from inside the space through the projection panel. The display system 100 thus creates an externally viewable display for customers and passersby viewing the projection panel 100 from outside the building.

The projection panel 110 can comprise a non-transparent polycarbonate material as described above. The projection panel 110 is solidly constructed to provide the necessary level of protection. When the associated projection system is turned off, the projection panel 110 allows for light to pass into and out of the store or property, thus advantageously providing both an information display surface and a means allowing illumination of the interior space. Further, the projection system 12 can be specifically programmed to work with the projection panel 110, to insure the display of information is effective and conforms to the dimensions of the particular display. For example, an image template as previously described can be used to display a desired image.

The projection panels 110 may be permanently installed, or movable panels capable of being appropriately positioned at desired times. The placement and use of the projection panel is very flexible. For example, window panes could easily be replaced with the appropriate polycarbonate material. Additionally, project panels could be positioned in closure doors to provide additional advertising opportunities. In some situations, projection panels 110 can be placed adjacent to one or more transparent panels (e.g., glass or transparent polycarbonate) in order to provide both a viewing panel and a surface for displaying information. For example, a shopkeeper's window can include an upper or lower portion comprising a projection panel 110 in order to display advertising to window shoppers as they view a product display through a transparent panel. These are just a few of the possibilities and those skilled in the art will appreciate that a virtually limitless number of configurations are possible.

Referring to FIG. 5, the display system 100 can be implemented as a stand-alone system with a single projection panel 110 or, alternatively, as a networked system with a plurality of projection panels 110 at a single location. Similar to the embodiments of FIGS. 1-3, in the case of multiple systems in a single location, the PC 32 can handle any number of projection panels by using a VGA splitter 36 to send the content to more projectors 30 all showing the same content. If different content is required for more than one projection system 12 in a single location, the PC 32 can handle multiple different content presentations at the same time. Alternatively, multiple PCs 32 can be used to implement multiple separate display systems 100 at a single location. Referring to FIG. 6, the display system can include a remote content server 50 providing image data to multiple locations as described above with reference to FIG. 3.

It will be appreciated by those skilled in the art that possible embodiments include combinations of projection panels 10, 110 according to embodiments from FIGS. 1-3 and 4-6 depending upon the desires and needs of shopkeepers. For example, in some situations a single projection system 12 can be used with a combination of projections panels 110 (e.g., replacing a store window) and shutters 16 (e.g., that can roll down in front of or behind the store window). The projection system 12 can use a single projector 30, or multiple projectors, and can project simultaneously upon projection panels if desired (e.g., displaying images upon a window projection panel and shutter projection panels securing a doorway). The flexibility of the display system will be appreciated in that multiple configurations allow a shopkeeper to customize his or her display system to effectively display information while, at the same time, maintaining the security of the premises.

Thus, embodiments of the SYSTEM FOR COMBINED SECURITY AND DISPLAY OF PUBLICLY VIEWABLE INFORMATION are disclosed. Although the present invention has been described in considerable detail with reference to certain disclosed embodiments, other embodiments of the invention are possible. While exemplary embodiments of this invention have been illustrated and described, one skilled in the art will appreciate that various changes, adaptations, and modifications may be made therein without departing from the spirit of the invention and the scope of the appended claims.

What is claimed is:

1. A method of displaying an image while securing an opening in a building, comprising:
   temporarily securing an opening in a building with a roll down shutter comprising a plurality of projection panels and at least one transparent projection panel;
   loading image data from an input device into controller;
   displaying an image corresponding to the image data onto an in-store display;
   switching the image data through a network switch image and into a projector;
   generating at the projector the image from the switched image data for display on the plurality of projection panels; and
   viewing the displayed image on the plurality of projection panels.

2. A secure display system, comprising:
   a closure device for securely closing off an opening in a building, the closure device comprising:
      at least one projection panel for displaying an image through the at least one projection panel wherein at least a part of the projection panel has diffusion properties capable of transferring a display image projected at one side of the projection panel such that is can be seen when viewing the panel from the opposing side, and
      at least one transparent panel for viewing through the closure device into the building; and a projection system for projecting the image upon the at least one projection panel, the projection system comprising:
- a controller for generating the image;
- an input device coupled to the controller for supplying image data to the controller;
- an in-store display coupled to the controller;
- a splitter coupled to the in-store display and to the controller;
- a network switch coupled to the controller; and
- a projector coupled to the splitter and to the network switch, the projector positioned and aligned for illuminating the at least one projection panel to recreate the image upon the at least one projection panel.

3. The secure display system of claim 2, wherein the closure device further comprising:
- a plurality of the projection panels forming a roll down shutter framework interconnecting together each projection panel one with another; and
- a container for storing the projection panels that form the roll down shutter framework when the plurality of projection panels is rolled up.

4. The secure display system of claim 3, wherein each projection panel is composed of a milky white opaque polycarbonate material.

5. The secure display system of claim 4, further comprising a plurality of transparent panels composed of a transparent polycarbonate material.

6. The secure display system of claim 4, wherein the controller generates the image by loading the image data into projector through the network switch.

7. The secure display system of claim 6, wherein the projector provides a plurality of images at different corresponding locations of the projection panels within the roll down shutter framework.

8. The secure display system of claim 2, wherein the image comprises an advertising image.

9. The secure display system of claim 2, further comprising a plurality of closure devices configured for securely closing off a plurality of openings, wherein the projection system further comprises a plurality of projectors in communication with the controller, the plurality of projectors positioned and aligned for illuminating the projection panel of each closure device, and wherein the controller generates images to be displayed in connection with each closure device.

10. The secure display system of claim 9, wherein the controller generates a different image to be displayed in connection with each closure device.

11. The secure display system of claim 9, wherein the controller generates the same image to be displayed in connection with each closure device, and wherein the plurality of closure devices are configured for securely closing off a plurality of openings in a single building.

12. The secure display system of claim 9, wherein the plurality of closure devices are configured for securely closing off a plurality of openings in a plurality of buildings.

13. The secure display system of claim 12, further comprising a plurality of controllers and a content server configured to connect over a network, wherein each controller generates the image for each closure device based on image data accessible from the content server.

14. The secure display system of claim 2, wherein the closure device is configured for securely closing off a doorway in a building.

15. The secure display system of claim 2, wherein the closure device is configured for securely closing off a window in a building.

16. A secure display system, comprising:
- a closure device for securely closing off an opening in a building, the closure device comprising:
  - at least one projection panel for displaying a projected image through the at least one projection panel so that the image can be viewed from the other side of the panel, the projection panel comprising a milky white opaque polycarbonate material; and
  - at least one transparent panel for viewing through the closure device into the building;
- a projection system positioned and aligned to project a desired graphic image toward the at least one projection panel, the projection system comprising:
  - a controller for generating the desired graphic image;
  - an input device coupled to the controller for supplying image data to the controller;
  - an in-store display coupled to the controller;
  - a splitter coupled to the in-store display and to the controller;
  - a network switch coupled to the controller; and
  - a projector coupled to the splitter and to the network switch, the projector for illuminating the at least one projection panel with the desired graphic image.

17. The secure display system of claim 16, wherein the closure device further comprises: a plurality of transparent panels composed of transparent polycarbonate material for simultaneous viewing through the closure device.

18. The secure display system of claim 17, further comprising:
- a content server;
- a server firewall coupled to the content server and in communication with a network;
- a plurality of network routers in communication to the content server via the network through the server firewall;
- a plurality of related firewalls coupled to the network routers; and
- a plurality of controllers coupled to the network routers.

19. The secure display system of claim 18, further comprising a roll down shutter closure device having a plurality of projection panels interconnected together, and wherein the projection system comprises a plurality of projectors positioned and aligned for illuminating the at least one projection panel of the closure device and the projection panels of the roll down shutter closure device.

20. The secure display system of claim 19, wherein the closure device is configured for securely closing off a window in a building and the shutter closure device is configured for securely closing off a doorway in a building.

* * * * *